United States Patent Office 3,449,362  
Patented June 10, 1969

3,449,362  
ALKENYL HYDROCARBON SUBSTITUTED SUCCINIMIDES OF POLYAMINO UREAS AND THEIR BORON-CONTAINING DERIVATIVES  
Richard J. Lee, Park Forest, Ill., assignor to Standard Oil Company, Chicago, Ill., a corporation of Indiana  
No Drawing. Filed Mar. 8, 1965, Ser. No. 438,103  
Int. Cl. C07d *27/00;* C07c *127/00;* C07f *5/02*  
U.S. Cl. 260—326.3          5 Claims This invention relates to derivatives of urea and more specifically pertains to novel polyamino ureas and novel succinimides of oil-soluble boron containing derivatives thereof which are useful lubricant oil additives of the ashless type.

The polyamino urea reactant of this invention are derived by reacting a "polyalkylene amine" with urea employing these reactants in the ratio of about two moles of polyalkylene amine for each mole of urea. By "polyalkylene amine" is meant those polyamines having the formula

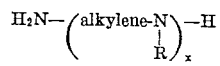

wherein $x$ is an integer of from 2 to about 10, R is hydrogen or a lower alkyl hydrocarbon substituent and "alkylene" is a lower alkylene, i.e. divalent, open chain, hydrocarbon group having from 1 to 8 carbon atoms. Such polyalkylene amines include methylene amines, ethylene amines, propylene amines, butylene amines, pentylene amines, hexylene amines, heptylene amines, octylene amines, and other polymethylene amines which contain from 2 to 10 alkylene groups and 3 to 11 nitrogens. Specific examples of such polyalkylene amines include dimethylene triamine, trimethylene tetramine, tetramethylpentamine, pentaethylene hexamine, heptaethylene octamine, dipropylene triamine, tripropylene tetramine, tetrapropylene pentamine, dibutylene triamine, tributylene tetramine, tributylene tetramine, tetrabutylene pentamine, dimethyl triamine, trimethylene tetramine, tetramethylene pentamine, pentamethylene hexamine, di(heptamethylene) triamine, di(trimethylene) triamine, decaethylene hendecamine, decamethylene hendecamine, $N_1,N_3$-dimethyl diethylene triamine, $N_1,N_5$-dimethyl tetraethylene pentamine, $N_1,N_5$-diethyl tetraethylene pentamine, dipentylene triamine, trihexylene tetramine, tetraheptylene pentamine, trioctylene tetramine, and tetrapentylene pentamine among others.

The foregoing polyalkylene amines where R is hydrogen are generally prepared by reacting an alkylene dihalide such as methylene dichloride, ethylene dichloride, propylene dichlorides, butylene dichlorides, propylene dichlorides, pentylene dichlorides, hexylene dichlorides, heptylene dichlorides and octylene dichlorides with ammonia. Where R is lower alkyl, i.e. methyl, ethyl, propyl, butyl, the alkylene dichloride-ammonia reaction product can be further reacted with the appropriate lower alkyl chloride.

The novel polyamino ureas of this invention are formed according to the following reaction equation where tetraethylene pentamine illustrative of the polyalkylene amine reactant and urea react in a 2:1 mole ratio.

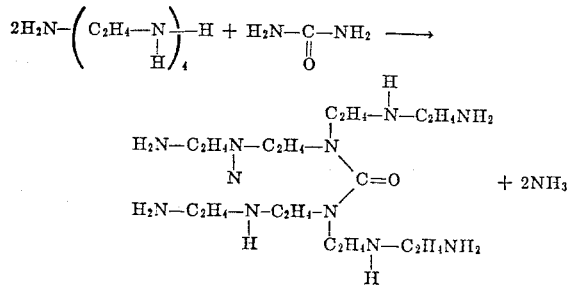

The resulting polyamino urea has the ten amino groups from the two moles of tetraethylene pentamine and the eight ethylene groups from the same source. There are also present in the polyamino urea product other polyamino ureas similar to that illustrated wherein the carbamide groups are from secondary amino nitrogens other than those shown and polyamino urea such as illustrated by the following:

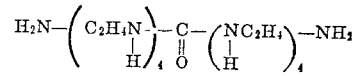

For the purpose of further discussion of this invention and also in the claims the class of polyamino urea will be defined as "reaction product of two moles of polyalkylene amine with one mole urea."

The polyamino urea reaction product of two moles polyalkylamine with one mole urea is prepared by conducting the reaction with or without a reaction diluent, preferably without, at a temperature in the range of 200 to 500° F. As hereinbefore indicated the reaction is complex not only because of the different types of polyamino urea products which form at one time but also because of additional side reactions, for example polymerization of monosubstituted urea and biuret formation. The complexity of the condensation reaction between two moles of polyalkylene amine with one urea can be illustrated by the following data in Table I obtained from the reaction of two moles tetraethylene pentamine with one mole urea at the designated temperatures for two hours.

TABLE I

| Example No. | Reaction temperature (°F.) | Reaction product properties ||||
|---|---|---|---|---|---|
| | | Percent N-total | Percent N-basic | Basic N/total N [1] | SSU viscosity at 210° F |
| 1 | 250 | 31.78 | 22.7 | 72 | 93 |
| 2 | 300 | 31.43 | 20.4 | 67 | 85 |
| 3 | 350 | 29.83 | 18.0 | 61 | 96 |
| 4 | 400 | 29.61 | 17.5 | 59 | 166 |

[1] Ratio percent N-basic/percent N-total×100.

The polyamino urea products of Examples 1 through 4 are subjected to infrared studies to determine relative densities of characteristic polyamino urea absorptions as determined from a ratio of absorbance at certain infrared frequencies to absorption at 1450 cm.$^{-1}$. These ratios are shown in Table II.

TABLE II.—RELATIVE DENSITIES OF CHARACTERISTIC POLYAMINO UREA ABSORPTION

| Product of Example No. | IR frequencies (cm.$^{-1}$) ||||||
|---|---|---|---|---|---|---|
| | 1,695 | 1,607 | 1,560 | 1,492 | 1,330 | 1,270 |
| 1 | 1.51(1,667) | 0.903 | 0.872 | 0.584 | 0.616 | 0.677 |
| 2 | 1.58 | 0.598 | 0.538 | 0.835 | 0.441 | 1.00 |
| 3 | 2.00 | 0.454 | 0.262 | 0.929 | 0.349 | 1.13 |
| 4 | 2.04 | 0.519 | 0.265 | 0.966 | 0.343 | 1.20 |

The increasing absorbance of frequencies 1695, 1492, and 1270 cm.$^{-1}$ are due to uramine concentration build-up as the reaction temperature is increased. Similarly, the decreasing absorbance of frequencies 1607, 1560 and 1330 cm.$^{-1}$ are due to the disappearance of reactants. Only two of the six frequencies are not known: 1492 cm.$^{-1}$ and 1330 cm.$^{-1}$. The assignment of 1695 cm.$^{-1}$ and 1270 cm.$^{-1}$ as secondary amide bands ($>C=O$ of Amide I and Amide III bonds respectively) and that of 1607 cm.$^{-1}$ and 1560 cm.$^{-1}$ as primary amide bands ($NH_2$ of Amide II) are conventional.

Viscosity might be used to determine the extent of completion of the condensation reaction producing the polyamino urea. However, as indicated in Table III, viscosity of reaction product does not depend on length of time of reaction. The four reactions (Examples 5, 6, 7 and 8) all used two moles tetraethylene pentamine and one mole urea and the reactions were carried out at 300° F. for the length of time indicated.

TABLE III.—POLYAMINO UREA VISCOSITY VERSUS REACTION TIME

| Example No. | Reaction time, hrs. | SSU viscosity at 210° F. |
|---|---|---|
| 5 | 4 | 84 |
| 6 | 3 | 66 |
| 7 | 2 | 85 |
| 8 | 1 | 97.5 |

However, more constant viscosity values (SSU at 210° F.) are obtained when the reactants are combined at an elevated temperature. This is shown in Table IV for Examples 9, 10, 11 and 12 wherein the reactants are combined at two different temperatures: 180° F. and 300° F. and then reacted at 400° F. In these examples the size of the reaction mixture is indicated as "one mole batch" and "five mole batch" which mean that 2 moles of tetraethylene pentamine and one mole of urea are reacted in a "one mole batch" and ten moles of tetraethylene pentamine and five moles of urea are reacted in a "five mole batch."

TABLE IV.—EFFECT OF CHARGE TEMPERATURE

| Example No. | Charge Temperature (° F.) | Charge Size | SSU viscosity at 210° F. |
|---|---|---|---|
| 9 | 180 | One mole batch | 76 |
| 10 | 180 | Five mole batch | 77 |
| 11 | 300 | One mole batch | 81 |
| 12 | 300 | Five mole batch | 80 |

Thorough mixing of urea with the polyalkylene amine to prevent agglomeration of urea and gradual heating of the mixture from 180 to 220° F. to reaction temperature, preferably in the range of 375 to 425° F., produces polyamino ureas of higher viscosity and higher nitrogen content. This is illustrated by the data in Table V from Examples 13, 14, 15, 16, and 17 wherein tetraethylene pentamine (TEPA) and urea are the reactants in a 2:1 mole ratio, the reactants are combined at 180° F. in all but Example 17 where the reactants are combined at ambient temperature (about 75–78° F.), different orders of combining the reactants, different degrees of mixing the combined reactants and different periods of heating up to reaction temperature of 400° F. were employed.

TABLE V.—MIXING EFFECT

| Example No. | Order of addition | Degree of mixing | Time, hours Heat-up | Time, hours Reaction | Product Percent N | Product SSU viscosity at 210° F. |
|---|---|---|---|---|---|---|
| 13 | Urea to TEPA | Very vigorous | 5 | 2 | 30 | 65.8 |
| 14 | TEPA to urea | Vigorous | 5 | 8 | 29 | 61.0 |
| 15 | do | Stirring | 1.25 | 6 | 27.6 | 58.0 |
| 16 | do | Mild | 5 | 8 | 28 | 56.0 |
| 17 | Slurry TEPA and urea cold. | Very vigorous | 5 | 5 | 32 | 105 |

It is preferred to first slurry the urea in a portion of the polyalkylene amine and add this slurry to the remainder of the polyalkylene amine heated to 180 to 220° F. with vigorous mixing and maintain vigorous mixing at least during heat-up to reaction temperature which heat-up period is preferably 3 to 5 hours.

Although in all of the foregoing seventeen illustrated examples tetraethylene pentamine and urea were the reactants employed, other specific polyalkylene amines of the types hereinbefore specifically named can be used in the same reactions. Useful polyamino ureas for a particular use hereinafter described are those obtained from diethylene triamine, triethylene tetramine, trimethylene tetramine, tetramethylene pentamine, dipropylene triamine and tripropylene tetramine. The high nitrogen content (theoretically 33.8% in the 2 TEPA:1 urea reaction product), the number of primary and secondary amino groups and the presence of the carbamide-carbonyl group in the polyamino ureas make these products of interest as reactants for the preparation of other organic chemical compounds.

The methods of preparing polyamino ureas hereinbefore illustrated provide yields of these products in the range of 80 to 90 mole percent with the remainder of the reactants appearing in biuret and polyureas formed from polymerization of the mono-polyalkylene amine substituted urea monomer.

The aforementioned particular further use of the polyamino ureas: reaction product of two moles polyalkylene amine and one mole urea, is in the formation of succinimides through reaction with a mono-alkenyl substituted succinic anhydride having as its alkenyl substituent a hydrocarbon group derived from polyolefin of 30 or more carbon atoms especially polypropylenes and polybutenes of 30 or more carbon atoms. The useful polypropylenes and polybutenes and hence the alkenyl substituent have a carbon content in the range of 30 to 200 carbons. The alkenyl substituent of the monoalkenyl succinic anhydride has a molecular weight in the range of from 400 to 100,000. The preparation of such monoalkenylsuccinic anhydrides by reacting maleic anhydride and a polypropylene or polybutenes of said 400 to 100,000 molecular weight range is known.

The alkenylsuccinimide derivatives of the polyamino ureas of this invention are obtained by reacting for each mole of monoalkenyl substituted succinic anhydride 0.4 to 0.7 mole of polyamino urea at 200 to 450° F., preferably 300 to 400° F. and aid in removing by-product water by the use of an inert gas, e.g. nitrogen purge or by passing the inert gas through the reaction mixture. This reaction between monoalkenylsuccinic anhydride and polyamino urea is advantageously carried out in an inert diluent such as xylene or preferably a light hydrocarbon lubricating oil such as solvent extracted SAE 5W oil or white mineral oil or mixtures of these hydrocarbon oils with polybutene or polypropylenes of the 500 to 100,000 molecular weight range. It is desirable to conduct said succinimide reaction with proportions of reactants which will provide the succinimide product in concentrations of from 40 to 60 weight percent when a light hydrocarbon diluent is used for such compositions are excellent concentrates for blending with lubricant base oils and other lubricant additives such as anti-rust, anti-wear, anti-corrosion, etc. agents. The succinimide product can be borated with boric acid, a boric acid ester, boric anhydride, etc. in the manner disclosed for borating similar acylated amines in U.S. Patent 3,000,916 issued Sept. 19, 1961, to Klass et al. The boration for example is conducted at 120 to 400° F. using from 0.2 to 2 or more moles of boric acid per mole of alkenylsuccinic anhydride. Although up to as high as about 1.5 gram atoms of boron per gram atom of nitrogen in the succinimide can be reacted, to retain high detergency and dispersancy provided by the amino groups and yet obtain the advantages of boration of acylated amines taught by Klass et al. it is desirable to have a boron to nitrogen (B/N) weight ratio in the finished product in the range of 0.05 to 1.0, preferably the B/N weight ratio is in the range of 0.10 to 0.5 inclusive.

The boration of other acylated amines such as poly primary amines acylated with dimer acids and polymer acids and ethylene amines and alkylene amines acylated with C$_{30}$ and higher alkenyl substituted succinic acids and anhydrides appears to be desirable for the purposes of providing higher anti-rust, anti-wear, etc. properties of formulated compositions. The boration appears to be desirable to reduce the tendency of the plurality of amino groups of those acylated amines from being too efficient and preventing metal protectors from forming desirable protective films on the metal surfaces. However, the succinimides of the polyamino ureas of this invention do not appear to require boration for the same reasons. In fact, exceptionally long-lasting lubricating formulations can be prepared from the unborated succinimides of the polyamino ureas of this invention as will hereinafter be exemplified. Also the succinimides of this invention need not have as high a carbon content in the alkenyl substituent on the succinic acid or anhydride moiety to have excellent oil solubility as do the alkenyl substituted succinic acid or anhydride derivatives (amides or imides) heretofore proposed as lubricant detergent and/or dispersant additives.

The following example illustrates the preparation of the alkenyl succinic anhydride derivative of the polyamino urea of this invention.

EXAMPLE 18

To a 3000 gallon kettle vented through a stack to the atmosphere there is charged 1254 gallons (9600 pounds) of a solution of polybutenyl substituted succinic anhydride having a molecular weight of about 960. This solution contains 54 weight percent of the substituted succinic anhydride dissolved in a mixture of 860 molecular weight polybutene and solvent extracted SAE 5W oil. Thus 5.4 moles of the polybutenyl succinic anhydride are charged. Also charged to the kettle are 339 gallons of additional solvent extracted SAE 5W oil. The resulting mixture is heated to 250–260° F. while blanketed with an inert gas such as nitrogen. Thereafter 122 gallons (1095 pounds or 2.7 pound moles) of a polyamino urea obtained by reacting two moles tetraethylene pentamine with one of urea is pumped in over 60 minutes. This di(pentamino) urea has a nitrogen content of about 30.5, a total base number (MgKOH/gram) of about 815, a SSU viscosity at 210° F. of about 72, a gravity of about 9.0 and a 365° F. flash point. The reaction mixture is heated to 300° F. and held at this temperature for about 2 hours while sparging nitrogen through the reaction mixture to aid in the removal of by-product water, about 97 pounds. The resulting reaction mixture contains about 49 weight percent di(polybutenylsuccinimide) of the di(pentamino) urea. Filtration of the reaction mixture generally provides a brighter (clearer) product.

When tetraethylene pentamine is reacted with C$_{30}$ and higher alkenyl substituted succinic acids and/or anhydride lower temperatures of combining these reactants are employed as well as lower initial reaction temperatures and slower rates of addition than are used in Example 18. The lower addition and reaction temperatures and slower addition rates are necessary to prevent excessive losses of tetraethylene pentamine.

Boration of the succinimides of polyamino ureas of this invention is illustrated in Example 19.

EXAMPLE 19

Before filtering the product of Example 18 and while that product is at 300° F., 600 pounds of boric acid slurried in 150 gallons of solvent extracted SAE 5W oil are added as rapidly as possible without causing excessive foaming. Thirty minutes is a suitable addition time for the slurry of boric acid in the SAE 5W oil. The slurry charge line is washed with an additional 100 gallons of SAE 5W oil first used to wash the vessel in which the slurry of boric acid was prepared. The resulting mixture is held at 300° F. for one hour, nitrogen is then sparged into and through the reaction mixture for 2 hours at 300° F. Thereafter the product is filtered using a filtering aid and cooled to ambient temperature. The product contains about 40 weight percent of the borated disuccinimide of di(pentamino urea), has a nitrogen content of 2.07 weight percent, a boron content of 0.58 weight percent, a $B/N$ weight ratio of 0.28 to 1.0, a gravity of 7.68 pounds per gallon, a SSU viscosity at 210° F. of 900 and a flash point of 380° F.

EXAMPLE 20

The process of Example 18 is repeated using 5.4 pound moles of polybutenyl succinic anhydride having a molecular weight of about 3100, 2.7 pounds moles of the dipentamino uprea and 11825 pounds of SAE 5W oil as reaction diluent. The resulting filtered product was a clear, light colored solution containing about 60 percent by weight of the disuccinimide of the dipentamino urea.

EXAMPLE 21

There are combined 2.7 pound moles of the dipentamino urea described in Example 18 and 5.4 pound moles of a polybutenyl succinic anhydride having a molecular weight of about 3100 as a 50 weight percent solution in about equal parts by weight of SAE 5W oil and 3000 molecular weight polybutene. After about 97 pounds of by-product water had been removed at 300° C. and sparging with inert gas, e.g. nitrogen, the reaction mixture is diluted further with SAE 5W oil, about 1000 pounds, to provide a 50 weight percent solution of the disuccinimide of the dipentamino urea.

EXAMPLE 22

The process of Example 21 is repeated except that after removal of by-product water a slurry of 600 pounds boric acid in SAE 5W oil at 200° F. is added and the mixture is heated at 300° F. for 90 minutes with nitrogen sparging. The resulting mixture is diluted with SAE 5W oil to a finished product solution of about 40 weight percent borated product and then filtered.

EXAMPLE 23

A 50 weight percent solution (solvent: 50% 1650 MW polypropylene and 50% SAE 5W oil) polypropenylsuccinic anhydride having a molecular weight of about 1750 is charged at 250° F. to a heat jacketed kettle to provide 6.0 pound moles of the succinic anhydride, 21,000 pounds of solution. Then there is added 735.5 gallons of the dipentamino urea (3.0 pound moles) described in Example 18 and this mixture is heated to 325° F. with nitrogen sparging until all the by-product water is removed. A slurry of 670 pounds boric acid in SAE 5W oil at 200° F. is added. Then the entire mixture is held at 300° F. for 90 minutes while sparged with nitrogen. This product is filtered using a diatomaceous earth filter aid and diluted with SAE 10 oil to a solution containing 45 weight percent of the borated product.

The effect of boration on the detergent-dispersant properties of the dialkenylsuccinimides of the polyamino ureas of this invention and the similar effect on detergent-dispersant properties of dialkenylsuccinimide of alkylene amines having 2 to 10 nitrogens can be shown by a comparison of results from a useful detergency candidate Spot Detergency Test. In this test oil formulations already tested under control tests at various levels of dispersancy ina standard engine detergency-dispersancy test are employed as source of "in engine" produced sludge. A composite of these used formulations is made and thoroughly mixed. A weighed amount of used oil composite and a weighed amount of the detergency candidate are combined and heated to 300° F. Thereafter this mixture is added to an equal volume of fresh unused, unformulated SAE 20 oil also at 300° F. The resultant mixture is held at 300° F. for two hours. Thereafter, while thoroughly stirring the hot mixture of fresh oil, used oil and detergency candidate, duplicate three drop (from capillary pipette) portions are placed on blotting paper. The blotting paper so treated is permitted to stand for 12 to 16 hours. There are two concentric circles where each three drop deposit is made. The inner circle is black and the outer annulus is somewhat clear. For each of the duplicate spot test the diameters measurements are made by measuring the spot diameter twice: two directions at right angles to each other. The outer circle diameters are taken in the same way. Thus for each set of duplicate spot tests, four diameter ratios are obtained. The average of the four ratios of diameter of spot to diameter of large oil ring multiplied by 100 is called SDT Number. The SDT Number relates semi-quantitatively to degree of sludge dispersancy of the candidate tested. This does not mean that SDT Number data can be used to predict the total sludge value rating which will be obtained in a Lincoln Sequence V engine test but when used with a control spot test (no fresh detergent) and compared with known high detergency additives tested at the same time the relative order of the SDT Numbers are indicative of performance to be expected from actual Lincoln Sequence V tests. SDT Number values of 60 to 80 for detergency candidates are indicative of likely success in attaining a passing minimum 35 total sludge value rating and not that a particular total sludge value rating will be achieved for any particular SDT Number value in the 60 to 80 range.

First with respect to effect of boration on detergent-dispersant properties. All detergent-dispersants were used at the same concentration of 2.0% by weight with portions of the same used oil. All borated products had the same $B/N$ weight ratio. Detergent-Dispersant A is the unborated $N_1,N_5$-disuccinimide of tetraethylene pentamine (TEPA) wherein the succinimide substituent is from polybutenylsuccinic anhydride (PBSA) having a molecular weight of about 1000. Detergent-Dispersant B is the boric acid borated derivative of Detergent-Dispersant A. Detergent-Dispersants A and B are given for purpose of comparison and they per se are not a part of this invention. The other detergent-dispersants are those of this invention and are also disuccinimides.

sulfonic acid derivative of a petroleum derived hydrocarbon which solution contains 40 weight percent of the calcium sulfonate and has a total base number of 300. The magnesium salt of a petroleum hydrocrabon derived hydrocarbon sulfonic acid which solution contains 40 weight percent of the calcium sulfonate and has a total base number of 300. The zinc dialkyl dithiophosphate additive is also a solution of the zinc salt in SAE 5W oil containing 57.9 percent by weight of the zinc salt whose groups are iso-propyl and oxo-decyl in the ratio of 65 mole percent isopropyl and 35 mole percent oxo-decyl. The disuccinimide polyamino urea used as dispersant-detergent is a solution thereof in a liquid polybutene-SAE 5W oil mixed solvent containing 40 weight percent of the disuccinimide as the borated or non-borated derivative. The solution of disuccinimide has a nitrogen content of 2 weight percent and the boron content is indicated by the boron to nitrogen weight ratio $(B/N)$ wherein a specific number above zero not only indicates the presence of boron but also said $B/N$ weight ratio and a $B/N$ value of zero indicates the unborated disuccinimide. The disuccinimide $(B/N=O)$ is that of Example 18. In the formulations all "percent" are volume percent.

Formulation A

Ingredient: Volume percent
SAE 20 base oil _____ 94.18
Zinc dialkyl dithiophosphate additive _____ 1.0
Disuccinimide additive ($B/N$ of 0.15) _____ 4.82

Formulation B

Ingredient:
SAE 20 base oil _____ 96.59
Zinc dialkyl dithiophosphate additive _____ 1.0
Disuccinimide additive ($B/N$ of 0) _____ 2.41

TABLE VI.—EFFECT OF BORATION ON DETERGENT-DISPERSANT PROPERTIES OF DISUCCINIMIDES

| Detergent-dispersant | Disuccinimide reactants | | Borated | | SDT number | SDT Number Reduction From Boration |
| | Polyamine | Alkenyl succinic anhydride | No | Yes | | |
| --- | --- | --- | --- | --- | --- | --- |
| A | TEPA | 1,000 MW PBSA | ✓ | | 67.2 | 6.4 A to B. |
| B | TEPA | 1,000 MW PBSA | | ✓ | 60.8 | |
| Example 24 | Dipentamino urea of Example 4. | 1,000 MW PBSA | ✓ | | 74.8 | 12.4 Examples 24 to 25. |
| Example 25 | do | 1,000 MW PBSA | | ✓ | 62.4 | |
| Example 20 | Dipentamino urea of Example 18. | 3,000 MW PBSA | ✓ | | 77.7 | 13.8 Examples 20 to 21. |
| Example 21 | do | 3,000 MW PBSA | | ✓ | 63.9 | |

The SDT Numbers of disuccinimides prepared from 1000 MW PBSA and the polyamino ureas of Examples 1, 2, 3, and 4 are, respectively, 43.5, 64.0, 56.0 and 74.8. This indicates that the 1000 MW PBSA—polyamino ureas of Examples 1 and 4 would not likely have adequate dispersant-detergent properties to provide a passing total sludge value rating for a Lincoln Sequence V engine test but the disuccinimides of those polyaminoureas of Examples 1 and 4 would be suitable detergent-dispersant additives for lubricant oils where continuous operation service is encountered.

The following lubricant oil formulations are prepared for use in standardized engine test procedures known as Lincoln Sequence V engine test, Ford-289 cubic inch displacement engine with positive crackcase vent (PCV) valve in crankcase vent line to intake manifold, an L-38 oxidation stability engine test and a diesel engine performance test in the Caterpillar 1-H diesel engine.

The following lubricant oil formulations are prepared by combining with the base oil the indicated additives as solutions. More specifically the calcium sulfonate additive is a solution in SAE 5W oil of the calcium salt of the Formulation C Ingredient:
SAE 20 base oil _____ 95.6
Zinc dialkyl dithiophosphate additive [1] _____ 1.0
Disuccinimide additive ($B/N$ of 0.35) _____ 2.4

[1] Alkyl groups are a mixture of $C_8$, $C_5$ and $C_3$ alkyl groups.

Formulation D

Ingredient:
SAE 20 base oil _____ 94.4
Zinc dialkyl dithiophosphate additive _____ 1.0
Disuccinimide additive ($B/N$ of 0.35) _____ 3.6
Magnesium sulfonate additive _____ 1.0

Formulation E

Ingredient:
SAE 20 base oil _____ 95.58
Zinc dialkyl dithiophosphate additive [1] _____ 0.82
Disuccinimide additive ($B/N$ of 0.0) _____ 3.60
Magnesium sulfonate additive _____ 1.0

[1] Alkyl groups are a mixture of $C_8$, $C_5$ and $C_3$ alkyl groups.

Formulation F

Ingredient:
- SAE 20 base oil _____ 96.79
- Zinc dialkyl dithiophosphate additive _____ 1.0
- Magnesium sulfonate additive _____ 1.0
- Disuccinimide additive (B/N 0.27) _____ 1.2

Formulation G

Ingredient:
- SAE 20 base oil _____ 93.0
- Zinc dialkyl dithiophosphate additive [1] _____ 1.0
- Calcium sulfonate additive _____ 1.0
- Disuccinimide additive (B/N 0.5) _____ 5.0

[1] Alkyl groups are a mixture of $C_8$, $C_5$ and $C_3$ alkyl groups.

Formulation H

Ingredient:
- SAE 20 base oil _____ 96.6
- Zinc dialkyl dithiophosphate additive _____ 1.0
- Disuccinimide additive (B/N of 0) _____ 2.4

Formulation I

Ingredient:
- SAE 20 base oil _____ 96.6
- Zinc dialkyl dithiophosphate additive _____ 1.0
- Disuccinimide additive (B/N of 0.3) _____ 2.4

Formulation J

Ingredient:
- SAE 20 base oil _____ 96.6
- Zinc dialkyl dithiophosphate additive _____ 1.0
- Disuccinimide additive (B/N of 0.4) _____ 2.4

Formulation K

Ingredient:
- SAE 20 base oil _____ 94.6
- Zinc dialkyl dithiophosphate additive _____ 1.0
- Calcium sulfonate additive _____ 2.0
- Disuccinimide additive (B/N of 0.27) _____ 2.7

The foregoing formulations were subjected to four engine performance tests according to the following tabulated test schedule:

| Lincoln MS sequence V | Ford 289 Cubic Inch | CLR L-38 | Caterpillar diesel 1-H |
|---|---|---|---|
| Formulation A | Formulation G | Formulation H | Formulation K. |
| Formulation B | | Formulation I | |
| Formulation C | | Formulation J | |
| Formulation D | | | |
| Formulation E | | | |
| Formulation F | | | |

LINCOLN MS TEST SEQUENCE V

Briefly, this test designed to evaluate dispersancy characteristics of formulated lubricant oils consists of using the oil to be tested as a lubricating oil in a V-8 Lincoln engine under prescribed test conditions. Accordingly, five quarts of oil are placed in the crankcase and the engine is started and run in accordance with the four hour cycle:

| | Phase 1 | Phase 2 | Phase 3 |
|---|---|---|---|
| Duration (min.) | 45 | [1] 2 | 75 |
| Speed, r.p.m. | 500 | 2,500 | 2,500 |
| Load, lbs. | No load | (2) | (2) |
| Temperature, °F.: | | | |
| Water out | 115-120 | 125-130 | 170-175 |
| Oil sump | 120-125 | 175-180 | 205-210 |
| A/F | 9.5±0.5 | 15.5±0.5 | 15.5±0.5 |

[1] Hour.  [2] 105 HP.

The four-hour cycle is reset a total of 48 times (192 hours running time). After each 16 hours of operation the engine is shut down for 8 hours. Two-ounce samples of oil are taken every 30 hours and the oil level is adjusted with fresh oil to a level of five quarts. Added oil is weighed. At the time of the test, the hot oil is drained, weighed and recorded. The engine is then disassembled and tested for deposits of varnish and sludge among other observable results as set out in the table below. Engine components are examined visually and rated on a scale of 1 to 10, 10 being a perfect reading indicating no sludge or varnish. A rating of 50 for total sludge and for total varnish is considered perfect; a rating of 10 for piston varnish is considered perfect; a rating of 60 percent or lower is considered passing for screen clogging; and a rating of 50 percent or lower is considered passing for ring plugging.

The results from these tests are hereinafter presented.

The Ford 289 cubic inch displacement engine test, hereinafter designated as "F-289 Test," is conducted in the same manner as the Lincoln MS Test Sequence V except for the apparent difference in test engines. This F-289 Test is more severe with respect to both sludge and varnish formation and deposition. Also the F-289 Test is conducted with vapors from the crankcase being introduced into the engine fuel intake system by means of a positive crankcase ventilation system which, in part, results in the more severe sludge and varnish formation during test operation.

The CLR L-38 engine test is designed to evaluate high temperature oxidation stability of the formulated lubricant oil and such evaluation is based on piston varnish deposit and copper-lead bearing corrosion. In this test a single cylinder water cooled Labees oil test engine is operated at 3150 r.p.m. for 40 hours with the test oil formulation. The oil is maintained at 300° F. and cooling water is maintained at 195° F. Copper-lead connecting rod bearings are weighed before and after the 40 hour test. Bearing weight loss (BWL) of 50 milligrams or less is desired. After the 40 hour test the piston is visually evaluated and a varnish value is assigned by comparison to varnish deposite pictoral standards having assigned values of 1 to 10 for the color and extent of varnish deposit. In this varnish value scale of 1 to 10, the value 10 represents a clean and varnish free piston and the value 1 represents a substantially complete dark varnish coated piston. To qualify as a premium oil additive the varnish value should be 9.0 and above.

The caterpillar 1-H Diesel Engine Test is a 480 hour test conducted with a high-speed, super charged Caterpillar diesel engine. This test is designed to measure the high temperature detergency properties of crankcase lubricating oils for qualification under Army Ordnance Specification M.1. L-2104B. The performance of a candidate crankcase lubricating oil formulation is determined by inspection of piston top ring grooves for carbon deposit which is measured and percent of filling determined. The extent of varnish lacquer deposit on the piston lands and in the lower ring grooves is evaluated. To qualify, a candidate crankcase lubricating oil formulation tested should result in no more than and desirably less than 30% carbon deposit in the top ring groove. The deposit of only traces of varnish and lacquer are acceptable to qualify successfully.

The engine test performance data of the foregoing formulations are shown in the following tables.

LINCOLN MS TEST SEQUENCE V

| Lubricant Formulation | Sludge | Varnish | Oil ring plugging |
|---|---|---|---|
| A | 47 | 40 | None |
| B | 40 | 36 | 8 |
| C | 38 | 38 | 27 |
| D | 45 | 43 | None |
| E | 42 | 40 | 0 |
| F | 31 | 36 | 36 |

In the more severe Ford 289 Engine Test the use of Formulation G resulted in a sludge rating of 44, a varnish rating of 37 and no oil ring plugging.

L-38 ENGINE TEST

| Formulation | Bearing weight loss (mg.) | Piston varnish |
|---|---|---|
| H | 122 | 9.7 |
| I | 21 | 9.6 |
| J | 15 | 9.6 |

CATERPILLAR DIESEL 1-H ENGINE TEST

| Formulation | Carbon top ring grooves, percent | Varnish Lands | Bottom grooves |
|---|---|---|---|
| K | 10 | Trace | None. |

The superior detergency of the disuccinimide additive [bis-(alkylsuccinimides) of polyalkylene amines] of this invention over the bis-(alkylsuccinimide) of polyalkylene amines and thus borated derivatives can be illustrated by their use in crankcase lubricating oil formulations subjected to Lincoln MS Test Sequence V where the crankcase lubricating oil formulations contained the same base oil and the same zinc dialkyl dithiophosphate anti-corrosion anti-oxidant additive all in the same amounts. The only differences between the formulations are the amounts of detergent additive used to assure a sludge rating of at least 40. The three detergents used are all derived from a polybutenyl succinic anhydride whose polybutenyl substituent group has a molecular weight of about 860 and a commercial polyalkylene amine having a composition corresponding to tetraethylene pentamine (TEPA) used in a molar ratio of 2 moles polybutenyl succinimide per mole polyalkylene amine, and in the case of the borated product, boric acid. The detergent representative of those of this invention was derived from the same polybutenyl (MW of 860) succinic anhydride and di(pentamino) urea, i.e., the detergent prepared as described in Example 18. Thus these detergents are:

Detergent 1: bis-(polybutenyl succinimide) of TEPA
Detergent 2: borated bis-(polybutenylsuccinimide) of TEPA B/N=0.3
Detergent 3: bis-(polybutenylsuccinimide) of dipentamine urea

DETERGENT AMOUNT FOR 45 SLUDGE IN LINCOLN MS TEST SEQUENCE V

| | Wt. percent | Sludge rating |
|---|---|---|
| Detergent 1 | 2.0 | 40 |
| Detergent 2 | 2.0 | 43 |
| Detergent 3 | 1.0 | 40 |

From the foregoing it is apparent that the detergent additives derived from polyamino ureas of this invention are substantially more effective lubricant oil detergent-dispersant agents than those of the prior art such as are disclosed in U.S. Patent 3,087,936 of which Detergent 1 and Detergent 2 illustrate.

The alkenylsuccinimide derivatives of the polyamino ureas and their borated derivatives of this invention are useful blending agents for lubricant oil formulations when dissolved in hydrocarbon of the lubricant oil class, i.e., viscosity range of lubricant base blending oils, in the range of about 10% up to 50% by weight. Such concentrates are readily blended with oil solutions of other additive ingredients and with base oils to prepare fully formulated lubricant oils ready for packaging. For example, by flow or pump proportioning an oil solution of 83 weight percent dialkyl dithiophosphate (9.2% Zn, 8% P and 16% S), an oil solution (49 weight percent) of alkenyl-succinimide of tetraethylene pentamine-urea polyamino urea (Example 18), an oil solution of 40 weight percent manganese salt of alkyl-substituted aryl sulfonic acid (Total base number of 400), an oil solution of viscosity index improver, SAE-5 base oil and SAE 20 base oil are blended in a common transfer line feeding a centrifugal pump which in turn supplies a packaging machine for filling and sealing one-quart cans. Such a blending technique can be used to package formulations of the type hereinbefore disclosed and subjected to engine testing. For finished formulated lubricating oils the concentration of the borated or unborated alkenylsuccinimides of the polyamino ureas in lubricant oils can be varied in the range of 0.1 to 10 weight percent. Such compositions can be prepared by the aforementioned in line blending or by diluting the concentrates illustrated in Examples 18 through 23 with lubricant oils, e.g., SAE 10, SAE 20, SAE 30, SAE 40, SAE 50 and the like weights and mixtures thereof.

As hereinbefore indicated the detergent-dispersants of this invention can be used alone or with other lubricating oil additives such as the zinc dialkyl dithiophosphates, the alkaline earth metal sulfonates, the alkaline earth metal succinates, the alkaline earth metal hydroxyarylalkyl amines (hydroxyphenyl methylols-diamine reaction products sometimes called Mannich condensation products), viscosity index improvers such as the near solid polybutenes and polyacrylic acid esters, synthetic polyesters and polyether lubricant oils, sulfurized animal and vegetable oils, and other lubricant oil addition agents.

What is claimed is:

1. The alkenyl succinimide derivative of claim 5 derived from the polyamino urea of two moles tetraethylene pentamine and one mole urea.

2. The alkenyl succinimide derivative of claim 5 derived from the polyamino urea of two moles of a commercial polyalkylene amine having the composition of tetraethylene pentamine and one mole urea.

3. The borated product obtained by reacting at a temperature in the range of 120 to 400° F. boric acid with the alkenyl succinimide derivative of claim 5 to provide a boron to nitrogen weight ratio in the range of from 0.05 to 1.0.

4. The borated product obtained by reacting at a temperature in the range of 120 to 400° F. boric acid with the alkenyl succinimide derivative of claim 1 to provide a boron to nitrogen weight ratio of 0.10 to 0.5 inclusive.

5. An alkenylsuccinimide derivative obtained from the reaction of:
   (a) an alkenyl hydrocarbon substituted succinic anhydride having in its alkenyl substituent from 30 to 200 carbon atoms and
   (b) a polyamino urea derived from reacting at a temperature in the range of 200° to 500° F. urea and a polyalkylene polyamine of the formula

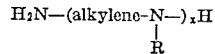

in which the alkylene is a hydrocarbon group of from 1 to 8 carbon atoms, R is hydrogen or a lower alkyl group of from 1 to 4 carbon atoms and $x$ is an integer of from 2 to about 10, at a mole ratio of two moles polyalkylene polyamine per mole of urea with the evolution of two moles ammonia per mole urea, conducted at a temperature in the range of 200° to 450° F. with 0.4 to 0.7 mole of polyamino urea per mole alkenyl hydrocarbon substituted succinic anhydride and with the removal of by-product water.

References Cited

UNITED STATES PATENTS

| | | | |
|---|---|---|---|
| 2,850,529 | 9/1958 | Pinson | 260—553 |
| 3,087,936 | 4/1963 | LeSuer | 260—326.3 |
| 3,219,666 | 11/1965 | Norman | 260—268 |
| 3,281,428 | 10/1966 | LeSuer | 260—326.3 |
| 3,282,955 | 11/1966 | LeSuer | 260—326.3 |
| 1,915,334 | 6/1933 | Salsberg et al. | 260—243 |
| 2,075,359 | 3/1937 | Salsberg et al. | 167—22 |
| 2,644,759 | 7/1953 | Schroeder | 106—28 |
| 3,172,892 | 3/1965 | LeSuer | 260—326.5 |

ALEX MAZEL, *Primary Examiner.*

J. TOVAR, *Assistant Examiner.*

U.S. Cl. X.R.

252—49.6, 51.5; 260—326.5, 553

UNITED STATES PATENT OFFICE
CERTIFICATE OF CORRECTION

Patent No. 3,449,362                                          June 10, 1969

Richard J. Lee

It is certified that error appears in the above identified patent and that said Letters Patent are hereby corrected as shown below:

Column 1, before line 9, insert

ABSTRACT OF THE DISCLOSURE

Polyamino ureas, the products from the condensation reaction of urea with a polyalkylene polyamine obtained according to U.S. Patent No. 2,644,759, are reacted with relatively high molecular weight alkenyl-substituted succinic anhydride to obtain the corresponding bissuccinimide of the polyamino urea. For example two moles of polybutenyl-substituted succinic anhydride of 960 molecular weight (polybutenyl-substituted group is about 860 molecular weight) is reacted under condensation reaction conditions separating out water with one mole of polyamino urea that is obtained by the condensation of two moles of tetraethylene pentamine with one mole of urea. Thus bissuccinimides of polyamino ureas and their boric acid borated derivatives are ashless detergent-dispersant type lubricating oil addition agents.

same column 1, line 15, "reactant of this invention" should read -- reactants used in this invention --; line 33, "dimethylene" should read -- diethylene --; line 38, "dimethyl" should read -- dimethylene --; same line 38, "trimethylene" should read -- triethylene --; and "tetramethyl" should read -- tetraethylene --. line 58, "The novel polyamino ureas of this" should read -- The polyamino urea reactants of this --; line 68, In the equation following the arrow, the second "N" should be connected to a single bond -- H -- rather than the single bond "N" as shown. Column 3, line 9, in Table III: "97.5" should read -- 79.5 --. Column 4, line 23, "polybutenes" should read -- polybutene --. Column 6, line 12 (Example 20): "uprea" should read -- urea --; line 64, (Example 23): "ina" should read -- in a --. Column 8, line 3, "The magnesium" should read -- The solution of magnesium --; line 4, "acid which solution contains" should read -- acid contains --; line 5, "the calcium sulfonate" should read -- the magnesium sulfonate - line 9, "whose groups" should read -- whose alkyl groups --. Column 11, line 68, "percent manganese salt" should read -- percent magnesium salt --.

Signed and sealed this 26th day of May 1970.

(SEAL)
Attest:

EDWARD M. FLETCHER, JR.
Attesting Officer

WILLIAM E. SCHUYLER, JR.
Commissioner of Patents